United States Patent
Schenkl et al.

(10) Patent No.: US 10,571,616 B2
(45) Date of Patent: Feb. 25, 2020

(54) PANEL LIGHTING MODULE AND METHOD FOR THE MOUNTING THEREOF

(71) Applicant: emz-Hanauer GmbH & Co. KGaA, Nabburg (DE)

(72) Inventors: Johann Schenkl, Bodenwoehr (DE); Michael Sorgenfrei, Schwarzhofen (DE); Tobias Baumer, Regenstauf (DE); Georg Wilhelm, Guteneck (DE)

(73) Assignee: emz-Hanauer GmbH & Co. KGaA (DE)

( * ) Notice: Subject to any disclaimer, the term of this patent is extended or adjusted under 35 U.S.C. 154(b) by 0 days.

(21) Appl. No.: 16/225,039

(22) Filed: Dec. 19, 2018

(65) Prior Publication Data
US 2019/0196086 A1 Jun. 27, 2019

(30) Foreign Application Priority Data
Dec. 22, 2017 (DE) .......................... 10 2017 011 959

(51) Int. Cl.
| | | |
|---|---|---|
| F21V 8/00 | (2006.01) | |
| F21V 15/01 | (2006.01) | |
| F21V 19/00 | (2006.01) | |
| F21Y 103/10 | (2016.01) | |
| F21Y 105/00 | (2016.01) | |
| F21W 131/305 | (2006.01) | |
| F21Y 115/10 | (2016.01) | |

(52) U.S. Cl.
CPC .......... *G02B 6/0021* (2013.01); *F21V 15/01* (2013.01); *F21V 19/003* (2013.01); *G02B 6/0086* (2013.01); *F21W 2131/305* (2013.01); *F21Y 2103/10* (2016.08); *F21Y 2105/00* (2013.01); *F21Y 2115/10* (2016.08)

(58) Field of Classification Search
CPC ... G02B 6/0021; G02B 6/0086; F21V 19/003; F21V 15/01
See application file for complete search history.

(56) References Cited

U.S. PATENT DOCUMENTS

| | | | |
|---|---|---|---|
| 7,338,195 B2 | 3/2008 | Ogino et al. | |
| 2007/0062213 A1* | 3/2007 | Malisi | F25D 23/04 62/377 |

(Continued)

FOREIGN PATENT DOCUMENTS

| | | | | |
|---|---|---|---|---|
| CN | 204300846 U | * | 4/2015 | ............... F21S 8/00 |
| DE | 102005036902 B3 | | 2/2007 | |

(Continued)

OTHER PUBLICATIONS

German search report from priority document DE 10 2017 011 959.7 dated Aug. 22, 2018.

*Primary Examiner* — Donald L Raleigh
(74) *Attorney, Agent, or Firm* — Sarita L. Pickett, Esq.; Robert R. Deleault, Esq.; Mesmer & Deleault, PLLC

(57) ABSTRACT

A panel lighting module includes a light guide plate which is intended for the outcoupling of light on at least one of its plate large faces, a light source arrangement having at least one light source arranged adjacent to a first plate narrow face of the light guide plate for coupling light into the first plate narrow face, and a biasing arrangement that resiliently biases the light source in the direction towards the first plate narrow face.

17 Claims, 3 Drawing Sheets

Fig. 3

(56) References Cited

U.S. PATENT DOCUMENTS

2013/0336008 A1* 12/2013 Kim .................. F21S 8/061
                                                    362/612
2014/0022821 A1   1/2014 Kim et al.
2016/0095450 A1*  4/2016 Trulaske, Sr. .......... A47F 11/10
                                                    312/116

FOREIGN PATENT DOCUMENTS

| DE | 102009034841 A1 | 2/2011 |
| DE | 202012012888 U1 | 7/2014 |
| DE | 20201504575 U1 | 11/2015 |
| EP | 1655536 A1 | 5/2006 |

* cited by examiner

PANEL LIGHTING MODULE AND METHOD FOR THE MOUNTING THEREOF

BACKGROUND OF THE INVENTION

1. Field of the Invention

The present invention relates generally to a panel lighting module for fitting into a domestic cooling device and a method of producing a panel lighting module.

2. Description of the Prior Art

In domestic refrigerators, it is generally required that the interior of the refrigerator, in which the foods to be kept cold are stored, is to be lit when the user opens a door of the refrigerator allowing access to the interior. The lighting is intended to make it easier for the user to see the foods stored in the refrigerator. Early lighting solutions were based on a simple filament lamp which was installed in a freely accessible manner in the refrigerator interior.

Other known lighting solutions shine light into a plate narrow face of a plate made of transparent material which serves as a shelf for foods, whereby the light disperses in the plate and emerges from the plate over a large area. Yet, other lighting solutions use a panel light which is set into an interior wall of the refrigerator and emits light over a large area directly into the refrigerator interior. Such panel lights usually have a plate part which faces towards the interior of the refrigerator and forms on its plate face facing towards the interior an outlet surface for the light of the panel light. Coupling of the light generated by a light source of the panel light into the plate part can take place either on the plate face of the plate part that faces away from the interior or via a plate narrow face of the plate part.

SUMMARY OF THE INVENTION

The invention is concerned, in particular, with those panel lights in which light is coupled into a plate narrow face of a light guide plate, which is intended for the outcoupling of light on at least one of its plate large faces. One object is to ensure the reliably good coupling of light into the plate narrow face of the light guide plate, despite component and installation tolerances which are generally unavoidable in practice, and thus ensure reliably good luminous power of the panel light.

In order to achieve that object, the invention provides, according to one aspect, a panel lighting module that includes a light guide plate which is intended for the outcoupling of light on at least one of its plate large faces, a light source arrangement having at least one light source, in particular in the form of a light-emitting diode, arranged adjacent to a first plate narrow face of the light guide plate, for coupling light into the first narrow face of the light guide plate, and a biasing arrangement which resiliently biases the light source in the direction towards the first plate narrow face. The biasing arrangement can ensure that the light source assumes a defined position relative to the first narrow face of the light guide plate in the finished installed state of the panel lighting module. This is the case, in particular, when a circuit board carrying the light source is not brought into a defined position relative to the first narrow face of the light guide plate by being fixedly connected to another component of the panel lighting module, but, for example, is only loosely inserted into a frame component of the panel lighting module. For example, it can happen that tilting of the light source brings about a colour shift of the light coupled into the light guide plate if the spectral emission pattern of the light source is not the same in all directions.

In some embodiments, the biasing arrangement biases the light source or a circuit board carrying the light source in contact with the first plate narrow face of the light guide plate. If the light source is mounted on a circuit board, it is expedient if the biasing arrangement presses resiliently against a side of the circuit board that faces away from the light source.

The light guide plate can be enclosed at the plate edges in a module frame at least in the region of the first plate narrow face. It is thereby advantageous for simple installation if the biasing arrangement has a biasing element which is fixedly connected to a frame component of the module frame or is formed integrally with the frame component. For example, the biasing element can be produced together with the frame component in a common injection moulding operation. Alternatively or in addition, it is conceivable that the biasing arrangement comprises at least one buffer element made of rubber-elastic material or a foamed material which is fastened to the frame component by an adhesive connection, for example.

The module frame can enclose the light guide plate on all sides, whereby the frame component is or forms a strip part extending over the entire length of the first plate narrow face.

Simple installation of the panel lighting module is made possible in that the module frame has two frame halves of quadrilateral form which are placed one on top of the other, which frame halves form between them a receiving pocket into which the light guide plate projects at the plate edges. The biasing arrangement can in this case be an integral part of at least one of the frame halves or can be fixedly attached to one frame half.

In some embodiments, the biasing arrangement comprises at least one spring element which acts in the manner of a leaf spring clamped on one side. For example, the spring element—when viewed in a section orthogonal to the longitudinal extent of the first plate narrow face of the light guide plate—is in the form of an angle piece which is free at one end. This angle piece can press in its angled region, for example, against a circuit board carrying the light source. It can have sufficient inherent elasticity for the biasing effect of the biasing arrangement. Alternatively or in addition, the required elasticity can originate at least in part from the region in which the spring element is clamped at one of its spring ends.

In some embodiments, the light source arrangement has a plurality of light sources which are arranged spaced apart one behind the other along the first plate narrow face and are mounted, for example, on a common circuit board.

Component and installation tolerances can not only have an adverse effect on the efficiency of the coupling of light into the light guide plate. Such tolerances can also lead to defects in tightness, which make it difficult or even impossible to use the panel lighting module in a moist environment. In a refrigerator, for example, a comparatively moist environment is regularly to be found, for example as a result of the storage of moist vegetables or fruit. The possibility that moist air will enter the region of the light source arrangement and the moisture will condense there cannot be ruled out. This can lead in the long term to corrosion at the electrical components of the panel lighting module and in extreme cases even to an electrical short circuit. Accordingly, it is an object of a further aspect of the invention disclosed herein to provide a panel lighting module which is suitable for use in a moist environment, as can prevail, for example, in a refrigerator interior.

In order to achieve the latter object, there is provided according to the invention a method of installing a panel lighting module, in particular, a panel lighting module of the type described hereinbefore. In the method, a light guide plate which is intended for the outcoupling of light on at least one of its plate large faces is enclosed at the plate edges in a module frame. The module frame has two frame components placed one on top of the other which delimit between them a receiving space into which the light guide plate projects at the plate edges in the installed state. At least one of the frame components has at least one groove which, in particular, extends along the plate edge and is open towards the receiving space. In the method, when the light guide plate is enclosed in the module frame, the groove is filled with a curable, in particular, viscous-pasty sealant, for example based on silicone, where the amount of sealant introduced into the groove is such that it protrudes over a groove edge of the groove. Overfilling the groove with sealant ensures that the module frame can be sealed with respect to the light guide plate even if a small gap remains between the groove edge and the light guide plate as a result of component or installation tolerances. For example, it cannot be ruled out that the light guide plate is subjected to certain manufacturing variations in terms of its plate thickness. Such thickness variations of the light guide plate can occur not only but in particular when the light guide plate is of multilayer construction, that is to say does not consist of a single piece of material. By suitably configuring the different layers of a light guide plate of multilayer form, the outcoupling of light on the plate large face that faces towards the space to be lit can be optimised.

In some embodiments, the frame component has a plurality of grooves running side by side at a distance from one another, of which only a partial number is filled with the sealant. For example, the frame component can have three grooves running side by side, of which only the middle groove is filled with the sealant. The groove or grooves which are not filled with sealant can then provide collecting spaces for sealant that runs or is forced out of the filled groove or grooves during installation of the panel lighting module.

Collecting grooves, that is to say grooves that provide a collecting space for excess sealant, can have a smaller width than fill grooves, that is to say grooves that are filled with the sealant.

In some embodiments, each of the frame components has a groove which is filled with the sealant when the light guide plate is enclosed in the module frame, where the grooves of the frame components are arranged in the installed state on both sides of the light guide plate, in particular opposite one another. In particular when a viscous-pasty sealant is used, the groove of both frame components can be filled with the sealant before the frame components are placed one on top of the other to enclose the light guide plate.

For the secure and permanent connection of the two frame components, they can be locked together when they are placed one on top of the other.

Although a domestic refrigerator has been considered as the application of the panel lighting module according to the invention, it will be appreciated that there are also other electrical devices in the home which require interior lighting. For example, a panel lighting module according to the invention can be used in a microwave oven or in a thermal oven or in a freezer. A limitation to domestic refrigerators is consequently not intended.

The invention will be explained in greater detail hereinbelow with reference to the accompanying drawings.

DETAILED DESCRIPTION OF THE INVENTION

Figure 1:
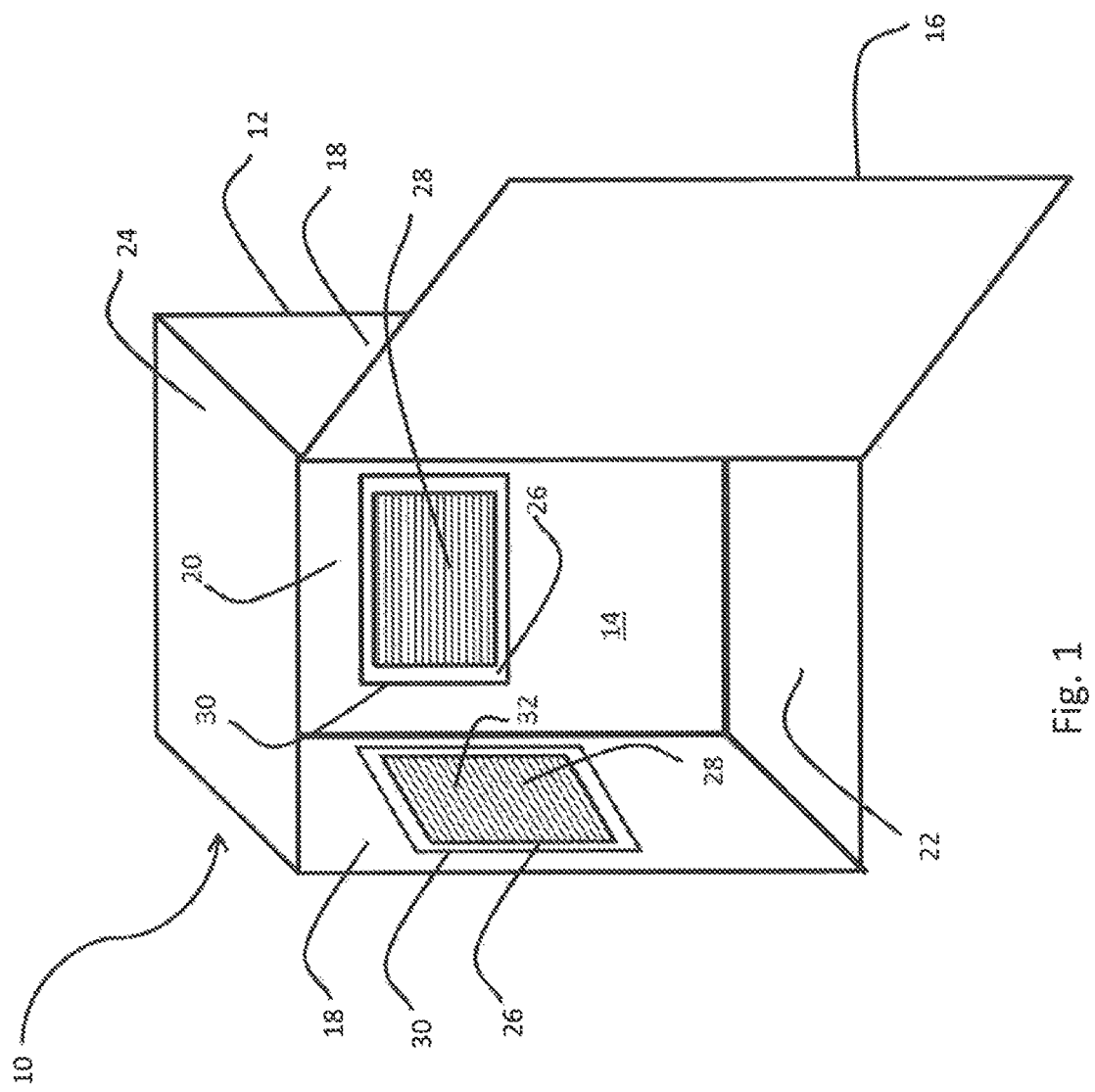
FIG. 1 is a schematic perspective view of a domestic electrical device of the cabinet type.

The domestic electrical device shown in FIG. 1, which is assumed in the following to be a refrigerator, is generally designated 10. It comprises a cabinet body 12 having an interior 14 which serves as the cold chamber for the cold storage of foods. A door 16 is mounted in a hinged manner on the body 12 in order to close the access to the cold chamber 14. The cold chamber 14 is delimited at the sides by two side walls 18, at the back by a back wall 20, at the bottom by a bottom wall 22 and at the top by a top wall 24. The walls 18, 20, 22, 24 are all part of the body 12.

When the door 16 is open, the user wishes for the cold chamber 14 to be lit so that he is better able to see the foods stored therein. To that end, a panel lighting module 26 is fitted into at least one of the walls 18, 20, 22, 24 of the refrigerator 10. In the example shown, such a panel lighting module 26 is shown in one of the side walls 18; a further panel lighting module 26 is shown in the back wall 20. It will be appreciated that the number and position of the panel lighting modules 26 are not subject to any limitations and the representation in FIG. 1 is to be understood as being purely by way of example. The panel lighting modules 26 are also not subject to any limitation as regards their size and shape, even though a rectangular or square shape—as shown in FIG. 1—may in some circumstances be the form that is most frequently encountered in practice. Within the context of the further explanation of the panel lighting modules 26, the modules 26 are assumed to have a quadrilateral shape, which—as stated—is to be understood as being purely by way of example.

Each panel lighting module 26 includes a luminous plate 28 which is enclosed on all sides in a quadrilateral module frame 30. The panel lighting module 26 is a prefabricated component which is inserted into an opening, not shown in greater detail, in the respective wall of the body 12 and is fastened therein, for example by a screw, adhesive or snap connection.

The luminous plate 28, which forms a light guide plate within the meaning of the invention, emits light into the cold chamber 14 via its plate large face—denoted 32—facing towards the cold chamber 14. Expediently, the luminous plate 28 is provided on its plate large face facing away from the cold chamber 14 with a light outlet barrier, for example in the form of a suitable reflective coating, in order to direct as far as possible all the available light into the cold chamber 14.

Figure 2:
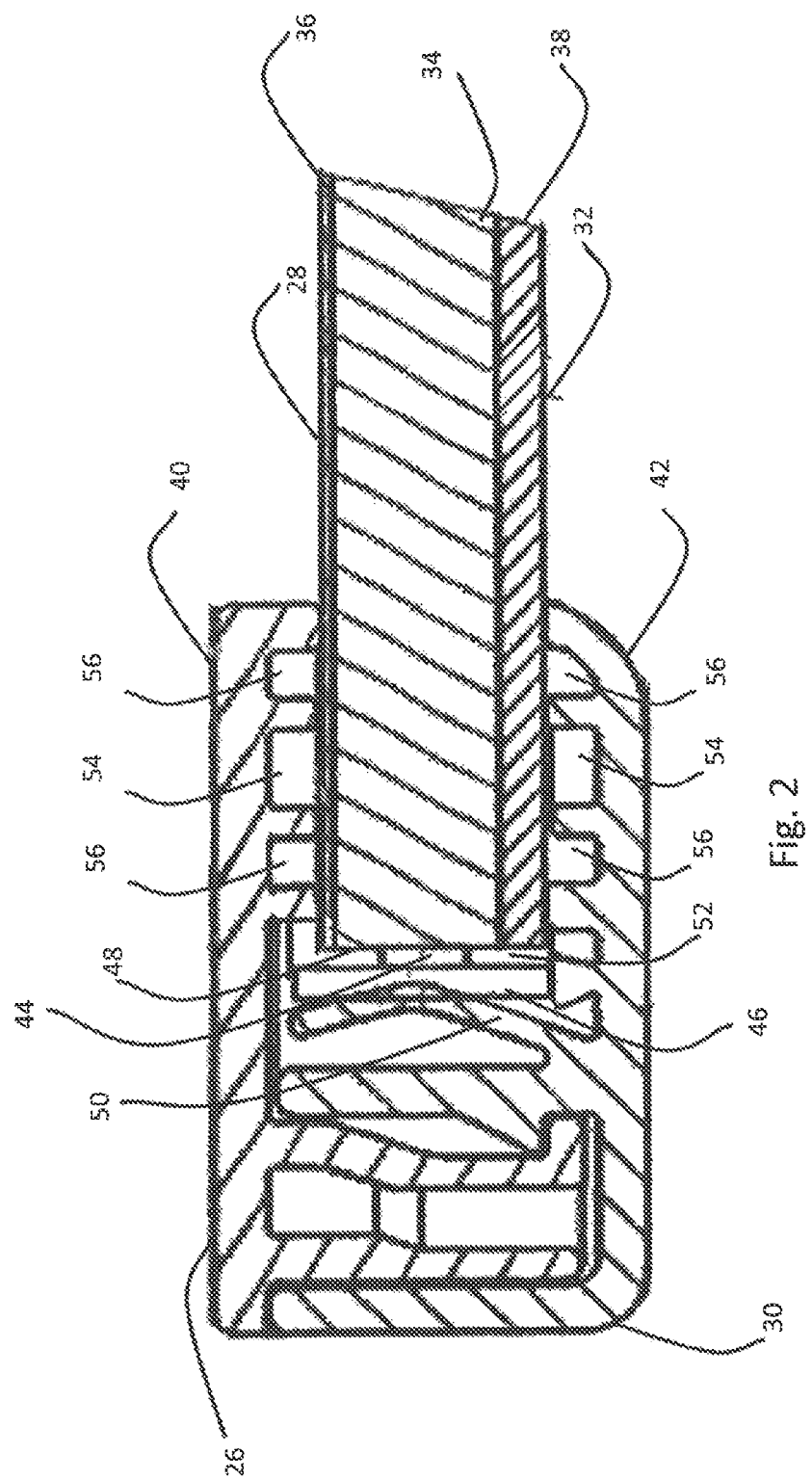
FIG. 2 shows, in section, part of a panel lighting module according to an exemplary embodiment.

Reference will now additionally be made to FIG. 2, in which one of the panel lighting modules 26 is shown in a sectional view. It will be seen that the luminous plate 28 is of multilayer construction, with a transparent core layer 34 which carries on the side facing away from the cold chamber a barrier layer 36, for example a reflective barrier layer, and on the side facing towards the cold chamber a diffusion layer 38, for example in opaque form.

In the example shown, the module frame 30 is of two-part construction and comprises a top frame half 40 and a bottom frame half 42. Where the terms top and bottom are used herein in connection with the frame halves 40, 42, this relates solely to the representation in FIG. 2 and does not mean any limitation as regards the installation position of the panel lighting module 26 in the refrigerator 10. Each of the frame halves 40, 42 extends around the entire luminous plate 28 and in this respect forms a closed quadrilateral. One or both of the frame halves 40, 42 are, for example, injection-moulded parts produced from plastics material. Alternatively, it is conceivable to form one or both of the frame halves 40, 42 from extruded profile material, for example from aluminium. In that case, four straight strip parts of the extruded material can in each case be combined to form one of the frame halves 40, 42.

For generating light, the panel lighting module 26 comprises a plurality of light-emitting diodes 44 serving as light sources, which light-emitting diodes are mounted together on a common circuit board 46 and are arranged adjacent to a plate narrow face 48 of the luminous plate 28. The plate narrow face 48 located outside at the edge of the luminous plate 28 forms a first plate narrow face within the meaning of the invention. The light-emitting diodes 44 are arranged one behind the other along the plate narrow face 48, for which reason only one of the light-emitting diodes 44 is visible in the sectional representation of FIG. 2. Owing to the arrangement of the light-emitting diodes 44 at the side of the plate edge of the luminous plate 28, the light of the light-emitting diodes 44 is coupled into the luminous plate 28 distributed over at least a portion of the thickness thereof. It will be appreciated that the use of light-emitting diodes as the light sources is only by way of example and that the use of other types of light sources is not ruled out within the context of the invention.

The circuit board 46 with the light-emitting diodes 44 mounted thereon is not fixed to one of the frame halves 40, 42 but is loosely inserted between the frame halves 40, 42. By means of a biasing element 50, which presses against the circuit board 46 from the side thereof that faces away from the diodes, the circuit board 46 and, with it, the light-emitting diodes 44 located thereon are biased in the direction towards the plate narrow face 48 of the luminous plate 28. Biasing by means of the biasing element 50 urges the light-emitting diodes 44 into contact with the plate narrow face 48. Regardless of any component and/or installation tolerances, a high efficiency of the coupling of the light of the light-emitting diodes 44 into the plate narrow face 48 of the luminous plate 28 can therefore reliably be ensured. The space between the two frame halves 40, 42, into which the circuit board 46 with the light-emitting diodes 44 mounted thereon is inserted, allows sufficient movement play of the circuit board 46 to be able to compensate for the mentioned tolerances with the aid of the biasing element 50 and reliably bring the light-emitting diodes 44 into contact with the plate narrow face 48.

In the example shown, the biasing element 50 is in the form of an angled spring tongue which is integrally formed with one of the frame halves 40, 42, here the bottom frame half 42. The spring tongue 50 is accordingly formed during the production of the bottom frame half 42 (e.g. by injection moulding or extrusion) as an integral part thereof. This is advantageous both in terms of production and in terms of installation. The spring tongue 50 acts in the manner of a leaf spring clamped on one side and has, for example, sufficient inherent elasticity or acquires the required elasticity from the region in which its bottom tongue end is clamped. As an alternative to a spring tongue, it is conceivable to equip one of the frame halves 40, 42 with at least one buffer element made of rubber-elastic material (rubber buffer) which serves as a biasing element for the resilient biasing of the circuit board 46 and the light-emitting diodes 44. Such a rubber buffer can be fixed to a rigid part of the frame half 40 or 42 in question, for example by an adhesive connection.

In the assembled state, the two frame halves 40, 42 form a pocket-like receiving space 52 in which the luminous plate 28 is inserted at a plate edge region. In the region of the mutually opposite pocket walls of this receiving space 52, the frame halves 40, 42 are each configured with an arrangement of grooves 54, 56 which are located opposite one another in pairs, that is to say a groove of the top frame half 40 is in each case located opposite a groove of the bottom frame half 42. In the example shown, the groove arrangement comprises a middle sealant fill groove 54 of larger cross-section and two sealant collecting grooves 56 of smaller cross-section arranged on both sides of the sealant fill groove 54. The grooves 54, 56 extend along the plate narrow face 48 in particular substantially over the entire length of the plate narrow face 48. Corresponding grooves can be provided in the region of each of the quadrilateral sides of the module frame 30. In particular, each of the grooves 54, 56 can extend around the entire luminous plate 28 without interruption.

Figure 3:
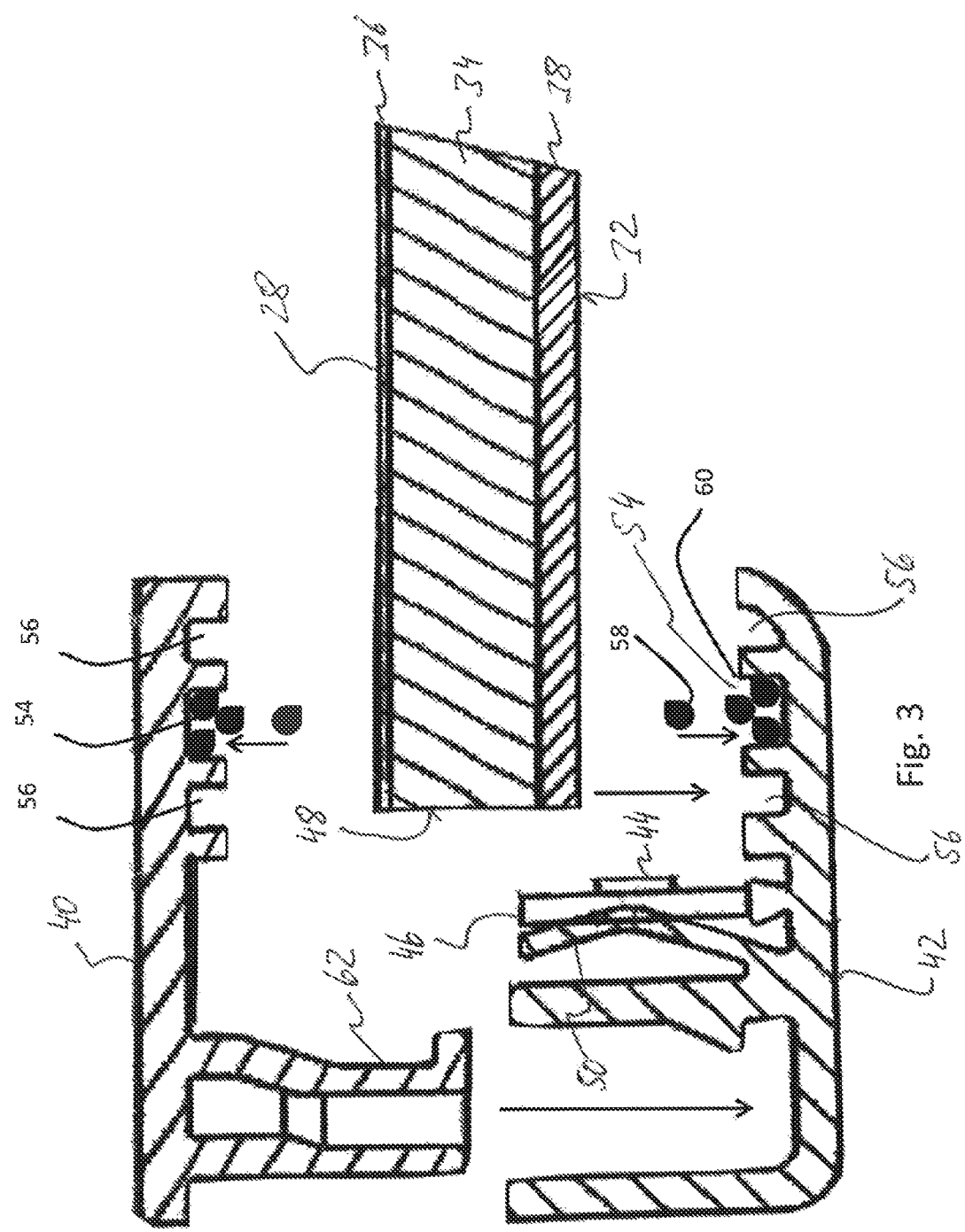
FIG. 3 is an exploded view of the components shown in FIG. 2 of the panel lighting module, in order to illustrate method steps for the installation of the panel lighting module.

In order to explain the assembly of the panel lighting module 26, reference will now additionally be made to FIG. 3. During installation, the sealant fill groove 54 of both frame halves 40, 42 is filled with a silicone sealant 58 or another suitable, sufficiently viscous and curable sealant. This is illustrated in FIG. 3 by schematically depicted drops of the sealant 58. The sealant fill grooves 54 are thereby overfilled, that is to say the amount of sealant 58 introduced into the grooves 54 is such that the sealant protrudes over the groove edge denoted 60. It is thereby ensured that the sealant 58 comes into contact with the luminous plate 28 when the two frame halves 40, 42 are joined together and they receive the luminous plate 28 between them. Contact of the sealant 58 with the surface of the luminous plate 28 is desirable in order to ensure good sealing of the electrical components of the panel lighting module 26 against the ingress of moisture.

However, because the sealant 58 protrudes over the groove edges 60 of the sealant fill grooves 54, some of the sealant 58 may be pushed away from the sealant fill grooves 54 to the sides when the frame halves 40, 42 are joined together. The sealant collecting grooves 56 form a collecting reservoir for such excess sealant 58. Undesirable accumulations of sealant thus do not form at locations in which they may in some circumstances be troublesome.

For the installation of the panel lighting module 26, the luminous plate 28 is first placed onto the bottom frame half 42, for example. The circuit board 46 with the light-emitting diodes 44 can already have been inserted into the bottom frame half 42 beforehand. Alternatively, it is possible to introduce the circuit board 46 with the light-emitting diodes 44 between the biasing element 50 and the plate narrow face 48 only after the luminous plate 28 has been placed onto the bottom frame half 42. The top frame half 40 is then fitted from above and connected to the bottom frame half 42. For the mutual connection of the two frame halves 40, 42, they may be designed with suitable snap structures 62, for example in the form of snap tongues, which lock together when the two frame halves 40, 42 are fitted together.

As the final step of the installation process, curing of the sealant 58 is effected. Either the sealant 58 is self-curing; alternatively or in addition, curing can be assisted or effected, for example, by the action of ultraviolet radiation— provided the sealant 58 is suitable therefor.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A panel lighting module, in particular for fitting into a domestic cooling device, comprising:
    a light guide plate which is intended for the outcoupling of light on at least one of its plate large faces wherein the light guide plate is enclosed at the plate edges in a module frame at least in the region of the first plate narrow face, and the biasing arrangement has a biasing element which is fixedly connected to a frame component of the module frame or is formed integrally with the frame component and wherein the module frame has two frame halves of quadrilateral form which are placed one on top of the other, the two frame halves form between them a receiving pocket into which the light guide plate projects at the plate edges;
    a light source arrangement having at least one light source, in particular in the form of a light-emitting diode, arranged adjacent to a first plate narrow face of the light guide plate, for coupling light into the first narrow face of the light guide plate;
    a biasing arrangement which resiliently biases the light source in the direction towards the first plate narrow face wherein the biasing arrangement is part of one of the two frame halves or is fixedly arranged on the one of the two frame halves.

2. The panel lighting module according to claim 1, wherein the biasing arrangement biases the light source or a circuit board carrying the light source in contact with the first plate narrow face.

3. The panel lighting module according to claim 1, wherein the light source is mounted on a circuit board and the biasing arrangement presses resiliently against a side of the circuit board that faces away from the light source.

4. The panel lighting module according to claim 1, wherein the module frame encloses the light guide plate on all sides and the frame component is or forms a strip part extending over the entire length of the first plate narrow face.

5. The panel lighting module according to claim 1, wherein the biasing arrangement comprises at least one spring element which acts in the manner of a leaf spring clamped on one side.

6. The panel lighting module according to claim 5, wherein the spring element, when viewed in a section orthogonal to the longitudinal extent of the first plate narrow face, is in the form of an angle piece which is free at one end.

7. The panel lighting module according to claim 1, wherein the biasing arrangement comprises at least one buffer element made of rubber-elastic material.

8. The panel lighting module according to claim 1, wherein the biasing arrangement comprises at least one buffer element made of a foamed material.

9. The panel lighting module according to claim 1, wherein the light source arrangement comprises a plurality of light sources which are arranged spaced apart one behind the other along the first plate narrow face and are mounted on a common circuit board.

10. A method of making a panel lighting module, the method comprising:
    obtaining a light guide plate having plate edges wherein the light guide plate is intended for the outcoupling of light on at least one of its plate large faces;
    obtaining a module frame having two frame components, each having a plate edge region, wherein the two frame components when placed one on top of the other delimit between them a receiving space wherein at least one of the frame components has at least one groove that extends along the plate edge region and is open towards the receiving space;
    filling the at least one groove with a curable sealant such that the curable sealant protrudes over a groove edge of the at least one groove; and
    enclosing the light guide plate in the module frame at the plate edges of the light guide plate wherein the light guide plate projects into the receiving space causing the curable sealant in the at least one groove to come into contact with the light guide plate when the two frame components are joined together thereby ensuring good sealing against the ingress of moisture;
    wherein the module frame obtaining step includes selecting a frame component having three grooves running side by side along the plate edge region and the filling step includes filling only the middle groove with the curable sealant.

11. The method according to claim 10, wherein the module frame obtaining step includes selecting the two frame components wherein each of the two frame components has a groove along the respective plate edge region and the filling step includes filling the groove of each of the two frame components with the curable sealant wherein each groove of the two frame components are opposite one another when the two frame components are assembled to each other.

12. The method according to claim 10 further comprising locking each of the two frame components together when placed one on top of the other when the plate edges are within the receiving space of the module frame.

13. The method according to claim 10, wherein the module frame obtaining step includes obtaining a frame component wherein the middle groove has a larger width than the other two grooves.

14. A method of making a panel lighting module, the method comprising:
    obtaining a light guide plate having plate edges wherein the light guide plate is intended for the outcouplinq of light on at least one of its plate large faces;
    obtaining a module frame having two frame components, each having a plate edge region, wherein the two frame components when placed one on top of the other delimit between them a receiving space wherein at least one of the frame components has at least one groove that extends along the plate edge region and is open towards the receiving space;
    filling the at least one groove with a curable sealant such that the curable sealant protrudes over a groove edge of the at least one groove; and
    enclosing the light guide plate in the module frame at the plate edges of the light guide plate wherein the light guide plate projects into the receiving space causing the curable sealant in the at least one groove to come into contact with the light guide plate when the two frame components are joined together thereby ensuring good sealing against the ingress of moisture, wherein the module frame obtaining step includes selecting a frame component having three grooves running side by side along the plate edge region and the filling step includes filling only the middle groove with the curable sealant.

15. The method according to claim 14, wherein the module frame obtaining step includes obtaining a frame component wherein the middle groove has a larger width than the other two grooves.

16. The method according to claim 14, wherein the module frame obtaining step includes selecting the two frame components wherein each of the two frame components has a groove along the respective plate edge region and the filling step includes filling the groove of each of the two frame components with the curable sealant wherein each groove of the two frame components are opposite one another when the two frame components are assembled to each other.

17. The method according to claim 14 further comprising locking each of the two frame components together when placed one on top of the other when the plate edges are within the receiving space of the module frame.

* * * * *